US008061746B1

(12) United States Patent
Stephens, III

(10) Patent No.: US 8,061,746 B1
(45) Date of Patent: Nov. 22, 2011

(54) MANGO HOLDER

(76) Inventor: Ross Stephens, III, Henderson, NV (US)

( * ) Notice: Subject to any disclaimer, the term of this patent is extended or adjusted under 35 U.S.C. 154(b) by 433 days.

(21) Appl. No.: 12/325,012

(22) Filed: Nov. 28, 2008

Related U.S. Application Data

(60) Provisional application No. 60/991,715, filed on Dec. 1, 2007.

(51) Int. Cl.
*A47G 21/00* (2006.01)
(52) U.S. Cl. .......................................................... 294/61
(58) Field of Classification Search ................ 30/113.1, 30/113.3, 164.8; 294/5, 61; 411/470, 484, 411/921; 99/421 A; 172/378
See application file for complete search history.

(56) References Cited

U.S. PATENT DOCUMENTS

| 66,557 | A | * | 7/1867 | Bridgins .................... 30/164.8 |
| 201,230 | A | | 3/1878 | de Yongh | |
| 441,333 | A | * | 11/1890 | Schofield .................... 30/164.6 |
| D26,777 | S | | 3/1897 | Donnelly | |
| 749,414 | A | * | 1/1904 | Washington ................ 7/112 |
| 1,539,669 | A | | 5/1925 | Hauser | |
| 1,769,471 | A | * | 7/1930 | Smith ........................ 30/322 |
| D274,207 | S | | 6/1984 | Lenaghan | |
| D306,114 | S | * | 2/1990 | Moll .......................... D7/683 |
| 4,955,813 | A | * | 9/1990 | Fochler ....................... 411/457 |
| 5,088,782 | A | | 2/1992 | Scott | |
| 5,209,685 | A | * | 5/1993 | Hammes ...................... 441/82 |
| 5,566,997 | A | | 10/1996 | Lin | |
| 6,012,749 | A | | 1/2000 | Farber | |
| 6,270,132 | B1 | | 8/2001 | Kretschmer | |
| D466,937 | S | * | 12/2002 | Kochlefl et al. ............ D19/65 |
| 6,898,857 | B2 | | 5/2005 | Ruben | |
| 2005/0150117 | A1 | | 7/2005 | Walzak | |
| 2005/0257696 | A1 | | 11/2005 | Walzak | |

* cited by examiner

*Primary Examiner* — Dean Kramer
(74) *Attorney, Agent, or Firm* — Kenehan & Lambertsen, Ltd.; John C. Lambertsen

(57) ABSTRACT

A mango fruit holder consists of a sharpened pair of tines extending from a grip handle. A pommel is located in the handle at the end opposite the tines, with a pair of tangs extending from and forming part of the tines through the handle into abutment with the pommel. Impact blows directed against the pommel are thereby efficiently transmitted through the tangs to the sharpened tines, assisting the penetration of the hardened mango seed by the tines. By temporarily anchoring the tines within the mango seed a user is able to use the handle to hold the mango while peeling and removing the edible mango flesh.

7 Claims, 2 Drawing Sheets

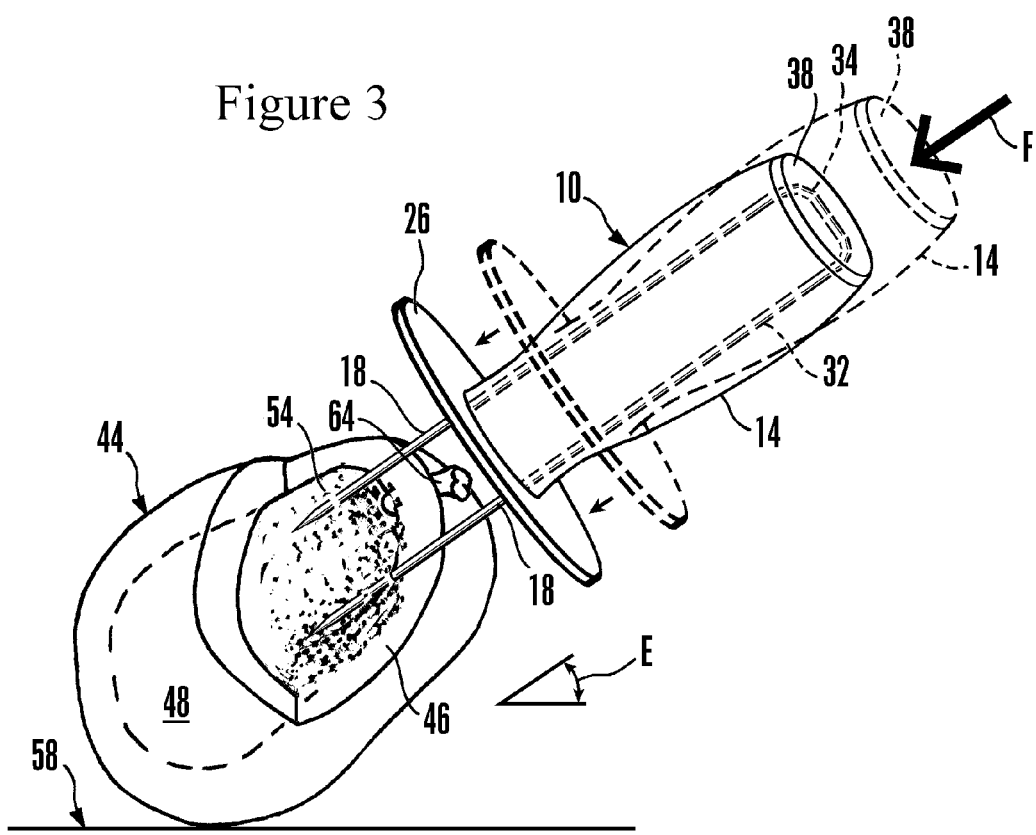

MANGO HOLDER

RELATED APPLICATIONS

The present application claims priority under 35 USC §119 (e) to U.S. Provisional Patent Application No. 60/991,715, filed Dec. 1, 2007, which is incorporated by reference herein for all that it contains.

BACKGROUND OF THE INVENTION

1. Field of the Invention

The present invention relates to hand-held utensils and, more particularly, to kitchen utensils for removing fruit peels and pits. More specifically, the present invention relates to a utensil for holding fruits, such as, for example, mangos, to assist in removing the outer peel and then the edible flesh that surrounds a hard, inner seed/pit.

2. Description of the Related Art

Mangos are fruit of the mango tree, which is now widely cultivated in frost-free tropical and subtropical climates. When ripe the fruit has an outer peeling of variable color—yellow, orange, and red. The center of the fruit is a single, flat oblong seed having a fibrous or hairless surface. The outer shell protects a single seed covered by a paper-thin lining.

The flesh of a ripe mango is very sweet, with a high water content making them refreshing to eat. Mangos occupy a special place in the diet of South Asian people, and have been termed the national fruit of India and the Philippines. Recently, the availability and popularity of mangos have increased in the more temperate regions, and kitchen techniques for removal of the flesh from the inner seed has resulted in the provision of specialized tools—for example that described in Walzak et al., U.S. Patent Publication No. US 2005/0257696.

Such available tools do not provide for the removal of the outer mango skin, and that can be hazardous, since the sharp tools required are used in a slippery environment of mango flesh and juice. It would be desirable to be able to securely retain the mango while utilizing knives and the like to remove and separate the mango flesh from the outer skin and the inner seed.

SUMMARY OF THE INVENTION

One aspect in accordance with the embodiments disclosed herein is a holder for fruit having an outer soft layer of edible fruit surrounding an inner hard pit, comprising: a handle of substantially cylindrical shape having first and second ends and a longitudinally extending outer gripping surface; a pommel attached to said first end of said handle; and a pair of rods received within said handle and projecting outwardly therefrom defining a pair of inner rods and a pair of projecting rods, said pair of inner rods extending from a location adjacent to and physically abutting said pommel entirely through said handle and said pair of projecting rods extending from said second end of said handle and projecting therefrom to an outer terminus, said pair of projecting rods extending an outer length selected to permit insertion of said pair of rods through said layer of fruit and a distance into said hard inner pit, temporarily anchoring said pair of projecting rods therein.

In a further embodiment a holder for mango fruit comprising: a pair of tines, each of said pair of tines having a terminus comprising a sharpened point; a handle of substantially linear configuration having first and second ends, said handle attached to and receiving said pair of tines at said first end of said handle; a pommel attached to said second end of said handle; and a pair of tangs in abutment with said pommel and received within and extending entirely through said handle, with each of said pair of tangs in compressive engagement with said pair of tines.

BRIEF DESCRIPTION OF THE DRAWINGS

The foregoing aspects and other aspects of this disclosure are described in detail below in connection with the accompanying drawing figures in which:

FIG. 3 is a perspective view, with portions broken away and portions in phantom, illustrating the holder of FIG. 1 engaging a seed located within a mango fruit.

DETAILED DESCRIPTION OF A PREFERRED EMBODIMENT

Figure 1:
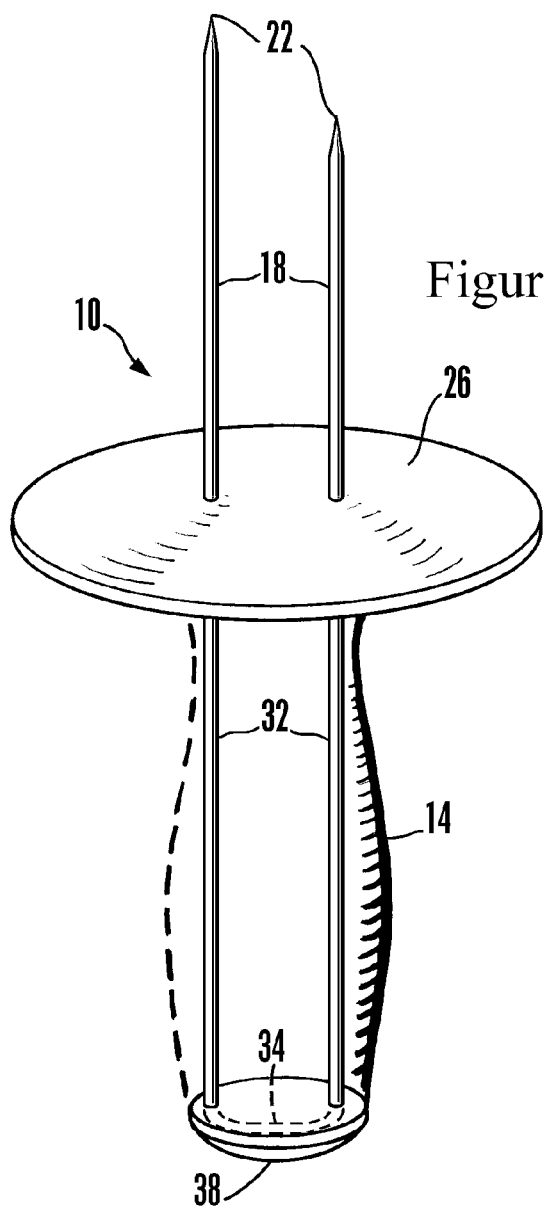
FIG. 1 is a perspective view, with portions removed and portions in phantom, of an exemplary holder incorporating an embodiment of the present invention.

Reference is now made to the drawings wherein like numerals refer to like parts throughout. In FIG. 1, a fruit holder 10 includes a handle 14 and a pair of projecting tines 18 that terminate in sharpened points 22. A deflector plate or guard 26 separates the pair of tines 18 from the handle 14 and is intended to provide protection to the user's hand from being cut during use of the fruit holder 10.

The pair of tines 18 extend into the handle 14, forming a corresponding pair of tangs 32. In FIG. 1 the pair of tangs 32 are shown as fabricated out of a unitary rod, with a u-shaped bridge 34 intermediately located and connecting the otherwise linear pair of tangs 32 and tines 18. The u-shaped bridge lies against and/or is connected to a pommel 38 that forms the terminus of the handle 14.

It is to be understood and appreciated that the present invention also contemplates such embodiments as where the pair of tangs 32 are not unitarily fabricated, and instead individually lie against and/or are connected to the pommel 38. In either case, as so configured impact energy received by the pommel 38 is transmitted through the pair of tangs 32, the pair of projecting tines 18, and the sharpened points 22, enhancing performance of the fruit holder 10 as will be discussed in association with FIG. 3, below. The pommel 38 can consist of a separate piece of metal attached to the handle 14, a hardened portion of plastic, or other material of greater density than the adjacent handle 14, such that impact energy is efficiently transmitted therethrough.

Figure 2:
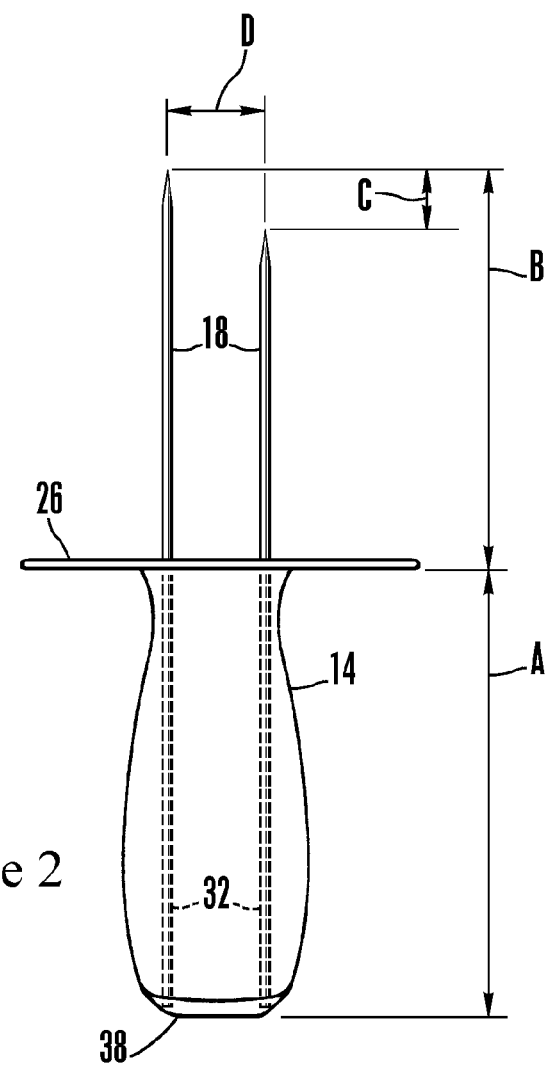
FIG. 2 is a side elevation view, with portions shown in phantom, of the holder of FIG. 1.

The fruit holder 10 of the present invention is preferably fabricated out of stainless steel for the tines, tangs, deflector plate, and pommel, for health reasons, although other metals, such as mild steels, might also be used. The handle 14 is preferably, at a minimum, approximately five (5) inches in length (length A in FIG. 2) and is fabricated out of a non-slip rubber material.

These present suggested dimensions are a result of large mangos that can weigh as much as three (3) pounds, requiring at least one of the tines having an overall length of three (3) inches, minimum, (length B in FIG. 2) with the other tine approximately ⅝ of an inch shorter (length C). The pair of tines is separated a length D of approximately ⅞ of an inch. The deflector plate 26 is appropriately sized at four (4) inches in diameter.

Use of the fruit holder 10 is shown in FIG. 3, with a mango 44 as the preferred fruit for the present invention. As mentioned previously, the mango 44 possesses physical characteristics that can make it difficult to obtain the edible inner fruit 46. An outer skin 48 must be peeled, and a fibrous inner pit/seed 54 clings to the surrounding fruit 46.

A presently preferred manner of making use of the present invention has, as a first step, the placement of the ripe mango 44 on a firm surface 58, with a stem 64 of the mango 44 facing up. The projecting tines 18 (prongs) of the mango holder 10 are inserted into the flesh of the mango 44 at a location such that the two projecting tines 18 straddle the mango stem 64. The mango holder 10 is oriented in a manner so as to place the longer of the two projecting tines 18 underneath or below the upper, shorter tine. Additionally, the two tines 18 are preferably inserted at an angle E of approximately 30 degrees with respect to the firm surface 58 on which the mango 44 rests.

A gentle but firm tap, represented by arrow F is applied to the pommel 38, using such kitchen-available implements as a small hammer, a meat tenderizer, a counter or cutting board surface, and the like. This tapping is continued until the two projecting tines 18 of the mango holder 10 are firmly embedded in the mango seed 54—ideally finding the softer equatorial region of the seed 54. The mango holder 10 can then be grasped by the user about the non-slip handle 14, permitting the mango 44 to be securely retained on the mango holder 10 as the user peels the outer skin 48 off the fruit. The edible fruit 46 is then exposed, permitting its removal, including separation of the final "scraps" from the inner seed/pit 54.

Once stripped of the edible fruit 46, the seed 54 can be removed from the projecting times 18 of the mango holder 10 and thrown away. The mango holder 10 can then be used with another mango 44 or washed and stored for later use.

Alternatively, the mango holder 10 can be used in a manner whereby upon attachment to a mango 44, the mango outer skin 48 is removed and the holder 10 used in a manner permitting the user to eat the edible fruit flesh 46 from the central seed 54 in a manner similar to eating a Popsicle® frozen confection product.

My invention has been disclosed in terms of a preferred embodiment thereof, which provides a mango fruit holder that is of great novelty and utility. Various changes, modifications, and alterations in the teachings of the present invention may be contemplated by those skilled in the art without departing from the intended spirit and scope thereof. It is intended that the present invention encompass such changes and modifications.

I claim:

1. A holder for fruit having an outer soft layer of edible fruit surrounding an inner hard pit, comprising:
   a handle of substantially cylindrical shape having first and second ends and a longitudinally extending outer gripping surface;
   a pommel attached to said first end of said handle; and
   a pair of rods received within said handle and projecting outwardly therefrom defining a pair of inner rods and a pair of projecting rods, said pair of inner rods extending from a location adjacent to and physically abutting said pommel entirely through said handle and said pair of projecting rods extending from said second end of said handle and projecting therefrom to an outer terminus, said pair of projecting rods extending an outer length selected to permit insertion of said pair of rods through said layer of fruit and a distance into said hard inner pit, temporarily anchoring said pair of projecting rods therein, wherein said pair of rods comprise a single rod having a pair of substantially right angle bends formed therein defining a substantially linear bridge segment centrally located along said single rod.

2. A holder according to claim 1, wherein said bridge segment is adjacent to and physically abuts an inner surface of said pommel.

3. A holder according to claim 2, wherein said bridge segment is physically attached to said inner surface of said pommel.

4. A holder according to claim 3, wherein said pair of rods extending from said bridge segment are of unequal length.

5. A holder for mango fruit comprising:
   a pair of tines, each of said pair of tines having a terminus comprising a sharpened point;
   a handle of substantially linear configuration having first and second ends, said handle attached to and receiving said pair of tines at said first end of said handle;
   a pommel attached to said second end of said handle;
   a pair of tangs in abutment with said pommel and received within and extending entirely through said handle, with each of said pair of tangs in compressive engagement with said pair of tines, wherein each of said pair of tangs is attached to a respective one of said pair of tines, each of said attached pairs of tangs and tines comprise a single rod, and each of said single rods extend from said pommel to said sharpened point, and wherein a bridge segment is attached to and perpendicularly extends from each of said single rods at an end thereof abutting said pommel; and
   a planar guard having a substantially circular outer periphery, said planar guard received along and perpendicularly extending from a central longitudinal axis of said handle, at a location along said central longitudinal axis between said first end of said handle and a location along said pair of tines spaced from said sharpened point.

6. A holder according to claim 5, wherein said bridge segment is attached to said pommel.

7. A holder according to claim 6, wherein each of said single rods and said bridge together comprise a unitary rod.

\* \* \* \* \*